Oct. 14, 1958        I. D. SMITH        2,855,790

SAFETY DEVICE FOR BALL SCREW AND NUT MECHANISM

Filed Feb. 8, 1954

*INVENTOR.*
IRA D. SMITH
BY
*ATTORNEY*

United States Patent Office 2,855,790
Patented Oct. 14, 1958

2,855,790

SAFETY DEVICE FOR BALL SCREW AND NUT MECHANISM

Ira D. Smith, Bedford, Ohio, assignor to Cleveland Pneumatic Industries, Inc., a corporation of Ohio Application February 8, 1954, Serial No. 408,761

2 Claims. (Cl. 74—459)

This invention relates broadly to a ball screw and nut unit, but more particularly to a safety device therefor.

In the usual ball screw and nut unit, operative interengagement of the nut and screw elements is effected by a series of balls circulating within a helical channel provided within adjacent walls of the elements. Failure of the unit is possible by accidental withdrawal of the balls from the channel, in which event the screw and nut elements are free to move axially relative to each other, thereby rendering the unit inoperable and also resulting in a sudden free and dangerous drop of the load carried by the elements.

It is therefore an object of this invention to provide such ball and screw units with a simple and efficient safety device capable of automatically preventing free axial movement of the screw and nut elements upon accidental withdrawal of the balls therefrom.

Another object of this invention is to provide such a ball screw and nut unit with self-contained means enabling continuous operation of the unit even after accidental removal of the balls therefrom.

Another object of this invention will be apparent from the following detailed description wherein similar characters of reference denote corresponding parts and wherein.

Figure 1:
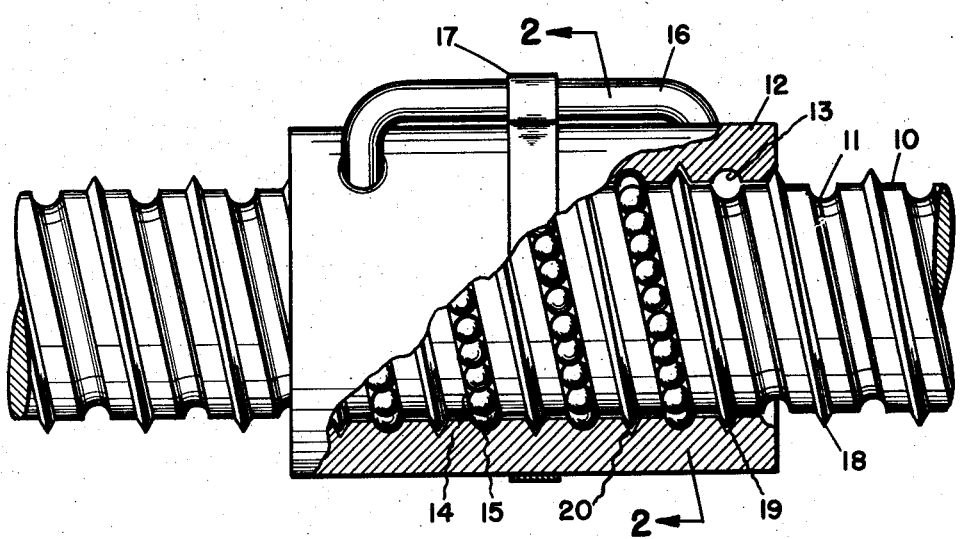
Figure 1 is a longitudinal view partly in section of a ball screw and nut unit embodying the invention.
Figure 2:
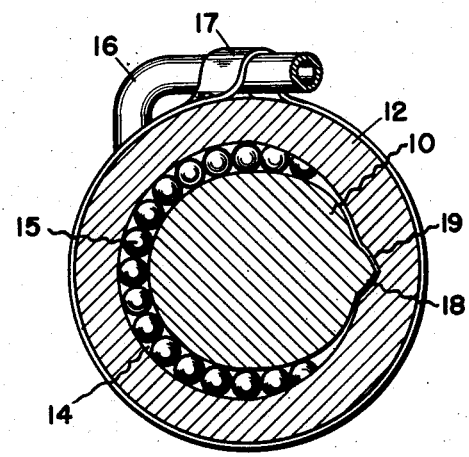
Figure 2 is a cross sectional view taken on line 2—2 in Figure 1.

Referring to the drawings, 10 represents a screw element formed with a helical groove 11 of semi-circular cross section extending the full length of the screw. A nut 12 is mounted on the screw for relative movement thereon and has its inner wall also provided with a groove 13 corresponding to groove 11 and forming therewith a helical channel 14 of circular cross section. As usual in this type of construction, the channel 14 is entirely filled with balls 15 for transmitting force from one element to the other, which balls are returned and re-circulated from one channel end to the other through a return tube 16 fixed in the nut element 12 by any suitable means such as a strap 17.

From the foregoing, it will be understood that if, for any reason, the tube 16 should break or become detached from the nut 12, all the balls 15 will be free to drop from the channel 14 resulting in disconnected screw and nut elements free to move axially relative to one another, thereby rendering the mechanism inoperable. To overcome this possibility, the invention contemplates the combination of an ordinary screw thread with the helical channel 14. As clearly shown in Figure 1, 18 represents a regular V-shaped male thread formed on the screw element 10 within the lands between the coils of channel 14, which thread is equally spaced from the channel or ball thread 13 and extends parallelly thereto the full end of the screw 10. The thread 18 is of the same lead as the channel 14 and fits loosely within a corresponding female thread 19 provided within the lands between the channel coils of the nut element 12.

During normal operation of the unit, the balls 15 are intended to carry the entire load from one element to the other, there being provided a clearance 20 between the screw threads 18 and 19, preventing their engagement so that the normal operation of the ball screw and nut unit may be assured without any interference from the screw threads 18 and 19. However, upon accidental withdrawal of the balls 15 from the channel 14, the screw threads 18 and 19 will be free to engage each other to prevent free axial movement of the screw and nut elements relative to each other. Furthermore, in the majority of cases, even the loose fit between the screw threads 18 and 19 will permit at least temporary operation of the unit.

From the foregoing description, it will be understood that the unit comprises an operative ball channel 14 and a normally inoperative screw thread 18 and 19, both of equal lead and pitch, the screw thread being capable of operative engagement only upon failure, or more particularly, upon withdrawal of the balls from the channel 14. In other words, the unit is provided with double threaded screw and nut elements, one thread being formed by the channel 14 and the other by the screw thread 18—19.

While the threads 18 and 19 are shown as V-shaped threads, it is understood that any shape may be used without departing from the spirit and scope of the invention.

I claim:

1. A device of the character described comprising cooperating screw and nut elements, a helical channel between said elements, balls within said channel for transmitting force from one element to the other, and operatively interengageable screw threads spaced between the coils of said channel formed integrally on said elements and normally spaced from each other by the balls within said channel.

2. A device of the character described comprising cooperating screw and nut elements, first and second helical means between said elements, removable anti-friction means within said first screw means rendering it operable and the second screw means inoperable, the thread of said second screw means being spaced between the coils of said first screw means and forming integral parts of said elements, second screw means being operable only upon rmoval of said anti-friction means from said first screw means.

References Cited in the file of this patent

UNITED STATES PATENTS

| 610,044 | Glenn | Aug. 30, 1898 |
|---|---|---|
| 2,069,471 | Baker | Feb. 2, 1937 |
| 2,486,055 | Mort | Oct. 25, 1949 |
| 2,623,403 | Terdina | Dec. 30, 1952 |

FOREIGN PATENTS

| 30,214 | Great Britain | July 7, 1910 |